(12) United States Patent
Don et al.

(10) Patent No.: US 10,870,266 B2
(45) Date of Patent: Dec. 22, 2020

(54) EQUIPMENT AND METHOD OF MAKING SUBSTRATE OF PLASTIC FLOORING

(71) Applicants: Zhao Pei Don, Tainan (TW); Lu Ding Yi, Tainan (TW)

(72) Inventors: Zhao Pei Don, Tainan (TW); Lu Ding Yi, Tainan (TW)

( * ) Notice: Subject to any disclaimer, the term of this patent is extended or adjusted under 35 U.S.C. 154(b) by 0 days.

(21) Appl. No.: 15/871,154

(22) Filed: Jan. 15, 2018

(65) Prior Publication Data

US 2019/0070844 A1    Mar. 7, 2019

(30) Foreign Application Priority Data

Sep. 1, 2017  (CN) .......................... 2017 1 0780384

(51) Int. Cl.
*B29L 9/00*        (2006.01)
*B32B 37/00*     (2006.01)
(Continued)

(52) U.S. Cl.
CPC .............. *B32B 41/00* (2013.01); *B29C 43/28* (2013.01); *B29C 44/20* (2013.01); *B29C 44/24* (2013.01); *B29C 44/569* (2013.01); *B29C 44/5681* (2013.01); *B29C 48/08* (2019.02); *B29C 48/21* (2019.02); *B29C 48/92* (2019.02); *B32B 5/20* (2013.01); *B32B 5/32* (2013.01); *B32B 27/065* (2013.01); *B32B 27/08* (2013.01); *B32B 27/304* (2013.01); *B32B 37/04* (2013.01); *B32B 37/1054* (2013.01); *B32B 37/153* (2013.01); *B29C 43/46* (2013.01); *B29C 43/52* (2013.01); *B29C 44/30* (2013.01); *B29C 44/505* (2016.11); *B29C 2948/92647* (2019.02); *B29K 2023/06* (2013.01); *B29K 2027/06* (2013.01);
(Continued)

(58) Field of Classification Search
CPC ............. B29C 48/0011; B29C 48/0021; B29C 48/906; B29C 43/28; B29C 44/20; B29C 44/24; B29C 44/5681; B29C 44/569; B29C 48/0013; B29C 48/0023; B29C 2948/92647; B32B 37/153; B32B 37/203; B32B 37/206; B32B 27/065; B32B 27/304; B32B 37/1054; B32B 37/156; B32B 41/00; B32B 2266/0235; B32B 2309/105
See application file for complete search history.

(56) References Cited

U.S. PATENT DOCUMENTS 3,146,492 A  *  9/1964  Lemelson ............... B29C 43/22
                                                                         425/327
2016/0200034 A1*  7/2016  Quanshan ........... B29C 48/0011
                                                                         428/141
(Continued)

*Primary Examiner* — George R Koch

(57) ABSTRACT

Equipment of making a substrate of plastic flooring contains: an extrusion unit, a thickness regulating unit, and a rolling apparatus. The extrusion unit includes an outlet, and the thickness regulating unit including an inlet, a channel, and a cooler. The rolling apparatus includes a first roller, a second roller, and a press roller. The press roller at least includes a contacting roller and a pressing roller, wherein the contacting roller is configured to roll a foaming sheet, a printing layer, and an abrasion resistant layer. Furthermore, a heating unit heats the foaming sheet, the printing layer, and the abrasion resistant layer so that the foaming sheet, the printing layer, and the abrasion resistant layer are connected by using the pressing roller.

5 Claims, 3 Drawing Sheets

(51) Int. Cl.
| | |
|---|---|
| B29C 43/52 | (2006.01) |
| B29C 44/30 | (2006.01) |
| B29K 105/04 | (2006.01) |
| B29L 31/00 | (2006.01) |
| B32B 41/00 | (2006.01) |
| B32B 37/04 | (2006.01) |
| B29C 44/56 | (2006.01) |
| B29C 44/24 | (2006.01) |
| B29C 43/28 | (2006.01) |
| B29C 48/92 | (2019.01) |
| B29C 48/08 | (2019.01) |
| B29C 48/21 | (2019.01) |
| B29C 44/20 | (2006.01) |
| B32B 5/20 | (2006.01) |
| B32B 5/32 | (2006.01) |
| B32B 27/06 | (2006.01) |
| B32B 27/08 | (2006.01) |
| B32B 27/30 | (2006.01) |
| B32B 37/10 | (2006.01) |
| B32B 37/15 | (2006.01) |
| B29K 27/06 | (2006.01) |
| B29C 44/50 | (2006.01) |
| B29C 43/46 | (2006.01) |
| B29L 31/30 | (2006.01) |

(52) U.S. Cl.
CPC ....... *B29K 2105/04* (2013.01); *B29L 2009/00* (2013.01); *B29L 2031/3017* (2013.01); *B29L 2031/732* (2013.01); *B32B 2037/0092* (2013.01); *B32B 2266/0235* (2013.01); *B32B 2471/00* (2013.01)

(56) References Cited

U.S. PATENT DOCUMENTS

2017/0183878 A1* 6/2017 Zhang ................. B29C 48/0021
2018/0154566 A1* 6/2018 Matet ...................... B29C 48/30
2018/0333931 A1* 11/2018 Miller ................. B32B 37/0053

* cited by examiner

EQUIPMENT AND METHOD OF MAKING SUBSTRATE OF PLASTIC FLOORING

FIELD OF THE INVENTION

The present invention relates to plastic flooring, and more particularly equipment and a method of making a substrate of the plastic flooring.

BACKGROUND OF THE INVENTION

Conventional plastic flooring contains a sheet made of foaming material or non-foaming material, wherein when the sheet is made of the foaming material, it is flexible but is adhered with a printing layer by way of glue, thus having poor production efficiency and environment pollution.

The present invention has arisen to mitigate and/or obviate the afore-described disadvantages.

SUMMARY OF THE INVENTION

The primary aspect of the present invention is to provide equipment and a method of making a substrate of plastic flooring which manufactures the plastic flooring environmentally friendly.

To obtain the above aspect, equipment of making a substrate of plastic flooring contains: an extrusion unit, a thickness regulating unit, and a rolling apparatus.

The extrusion unit includes an outlet defined on one end of the extrusion unit so that after foam molding plastic material, the plastic material is extrusion molded out of the outlet to produce a foaming sheet.

The thickness regulating unit is located outside and corresponds to the outlet, the thickness regulating unit includes an inlet, a channel configured to deliver the foaming sheet, and a cooler configured to cool the foaming sheet and to regulate a thickness of the foaming sheet.

The rolling apparatus includes a first roller, a second roller, and a press roller, wherein the first roller is configured to deliver the printing layer toward the press roller, and the second roller is configured to deliver the abrasion resistant layer toward the press roller.

The press roller is arranged beside the thickness regulating unit, and the press roller at least includes a contacting roller and a pressing roller, wherein the contacting roller is configured to roll the foaming sheet, the printing layer, and the abrasion resistant layer together. In addition, a heating unit heats the foaming sheet, the printing layer, and the abrasion resistant layer so that the foaming sheet, the printing layer, and the abrasion resistant layer are connected together by using the pressing roller.

In addition, a method of making a substrate of plastic flooring contains steps of:

A. foam molding a foaming sheet, wherein after foam molding a plastic material by using an extrusion unit, the plastic material is extrusion molded so as to produce the foaming sheet;

B. cooling the foaming sheet and regulating a thickness of the foaming sheet, wherein when the foaming sheet is delivered through a thickness regulating unit, the thickness of the foaming sheet is regulated by the thickness regulating unit and is cooled by a cooler;

C. rolling the foaming sheet with a printing layer and an abrasion resistant layer, wherein the foaming sheet is conveyed toward a press roller so as to roll with the printing layer and the abrasion resistant layer;

D. rolling the printing layer, wherein the printing layer is delivered toward the press roller by a first roller so as to be rolled;

E. rolling the abrasion resistant layer, wherein the abrasion resistant layer is conveyed toward the press roller by a second roller so as to be rolled;

F. heating the foaming sheet, the printing layer, and the abrasion resistant layer by using a heating unit so that the foaming sheet, the printing layer, and the abrasion resistant layer soften; and G connecting the foam layer, the printing layer, and the abrasion layer by way the press roller so as to finish the plastic flooring.

DETAILED DESCRIPTION OF THE PREFERRED EMBODIMENTS

Figure 1:
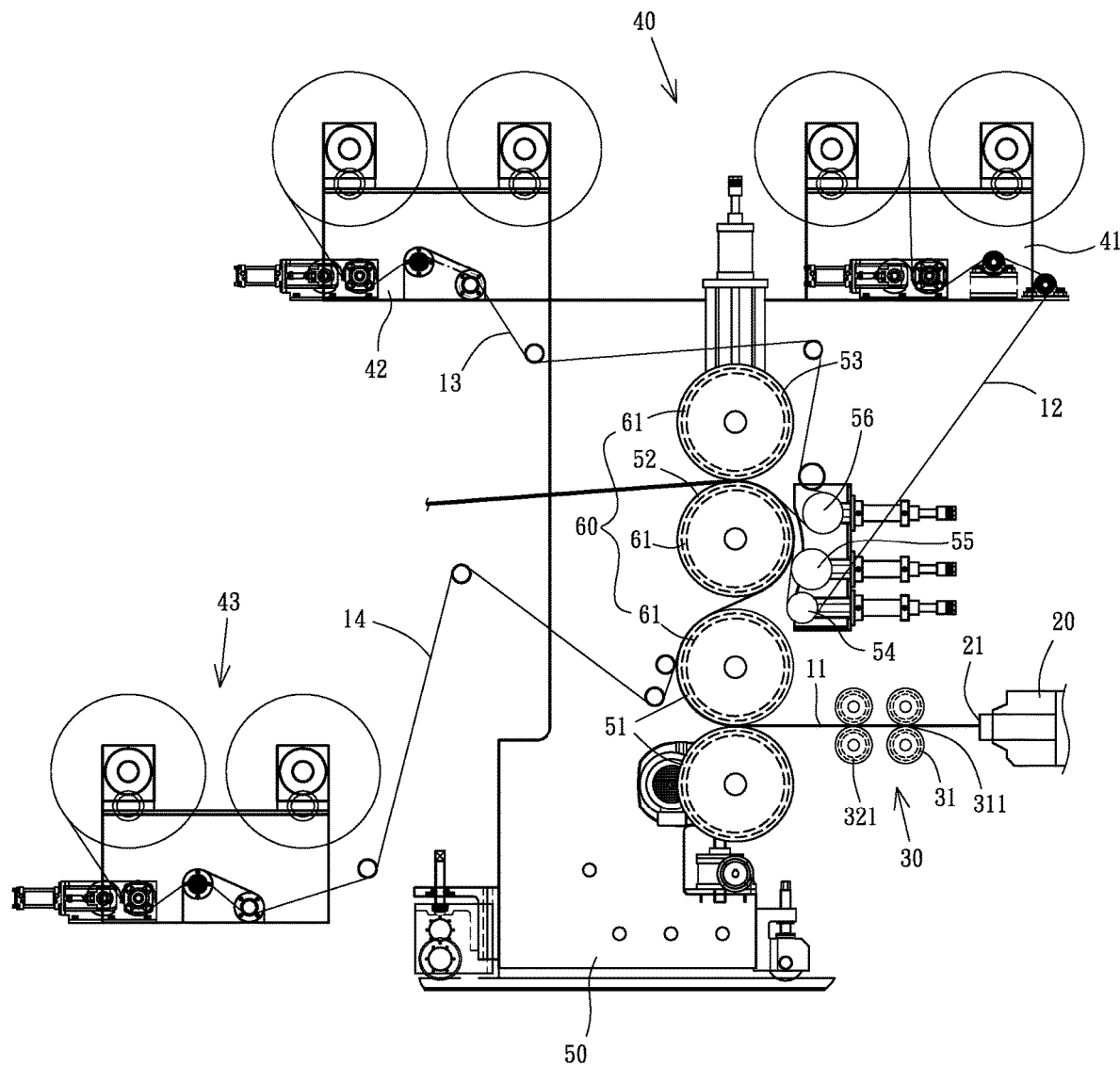
FIG. 1 is a schematic view showing the assembly of equipment of making plastic flooring according to a preferred embodiment of the present invention, wherein a press roller has four rollers arranged vertically.

Referring further to FIGS. 1-5, a method of making a substrate of plastic flooring according to a preferred embodiment of the present invention comprises steps of foam molding a foaming sheet 11 and connecting the foaming sheet 11, a printing layer 12, and an abrasion resistant layer 13 in a hot pressing manner by equipment which includes an extrusion unit 20, a thickness regulating unit 30, and a rolling unit 40.

The extrusion unit 20 includes an outlet 21 defined on one end of the extrusion unit 20 so that after foam molding plastic material, the plastic material is extrusion molded out of the outlet 21 to produce the foaming sheet 11, wherein the plastic material of the foaming sheet 11 is polyvinyl chloride (PVC) or polyethylene (PE), the plastic material is physical foamed or is chemical foamed, and an expansion ratio of the plastic material is adjustable based on a thickness of the abrasion resistant layer 13, wherein the extrusion unit 20 is an extruder configured to extrude a sole-layer foaming sheet 11 or is at least two extruders configured to extrude a multiple-layer foaling layer 11' with different harnesses.

The thickness regulating unit 30 is located outside and corresponds to the outlet 21, and the thickness regulating unit 30 includes multiple roller sets 31 driven by a motor (not shown) to rotate, wherein each roller set 31 has an inlet 311 defined between and outside two opposite rolling elements thereof, a channel separated inside the two opposite rolling elements of each roller set 31, and a cooler 32 defined in each roller set 31 so as to cool the foaming sheet 11 and to regulate a thickness of the foaming sheet 11, wherein the cooler 32 has a cooling tube 321 arranged in each rolling element 311 of each roller set 31 so as to flow cooling water.

The rolling apparatus 40 includes a first roller 41, a second roller 42, and a press roller 50, wherein the first roller is configured to deliver the printing layer 12 toward the press roller 50, and the second roller 42 is configured to deliver the abrasion resistant layer 13 toward the press roller 50.

The press roller 50 is arranged beside the thickness regulating unit 30 and has four rollers arranged vertically or has five rollers arranged horizontally. In this embodiment, the press roller 50 includes two delivery rollers 51, a contacting roller 52, a pressing roller 53, and multiple guiding rollers 54, 55, 56 outside the contacting roller 52. The two delivery rollers 51 are configured to roll the foaming sheet 11 so as to regulate a thickness of the foaming sheet 11, and the contacting roller 52 rolls the foaming sheet 11, the printing layer 12, and the abrasion resistant layer 13 together via the multiple guiding roller 54, 55, 56, thereafter a heating unit 60 heats the foaming sheet 11, the printing layer 12, and the abrasion resistant layer 13 so that the foaming sheet 11, the printing layer 12, and the abrasion resistant layer 13 connect together.

Figure 2:
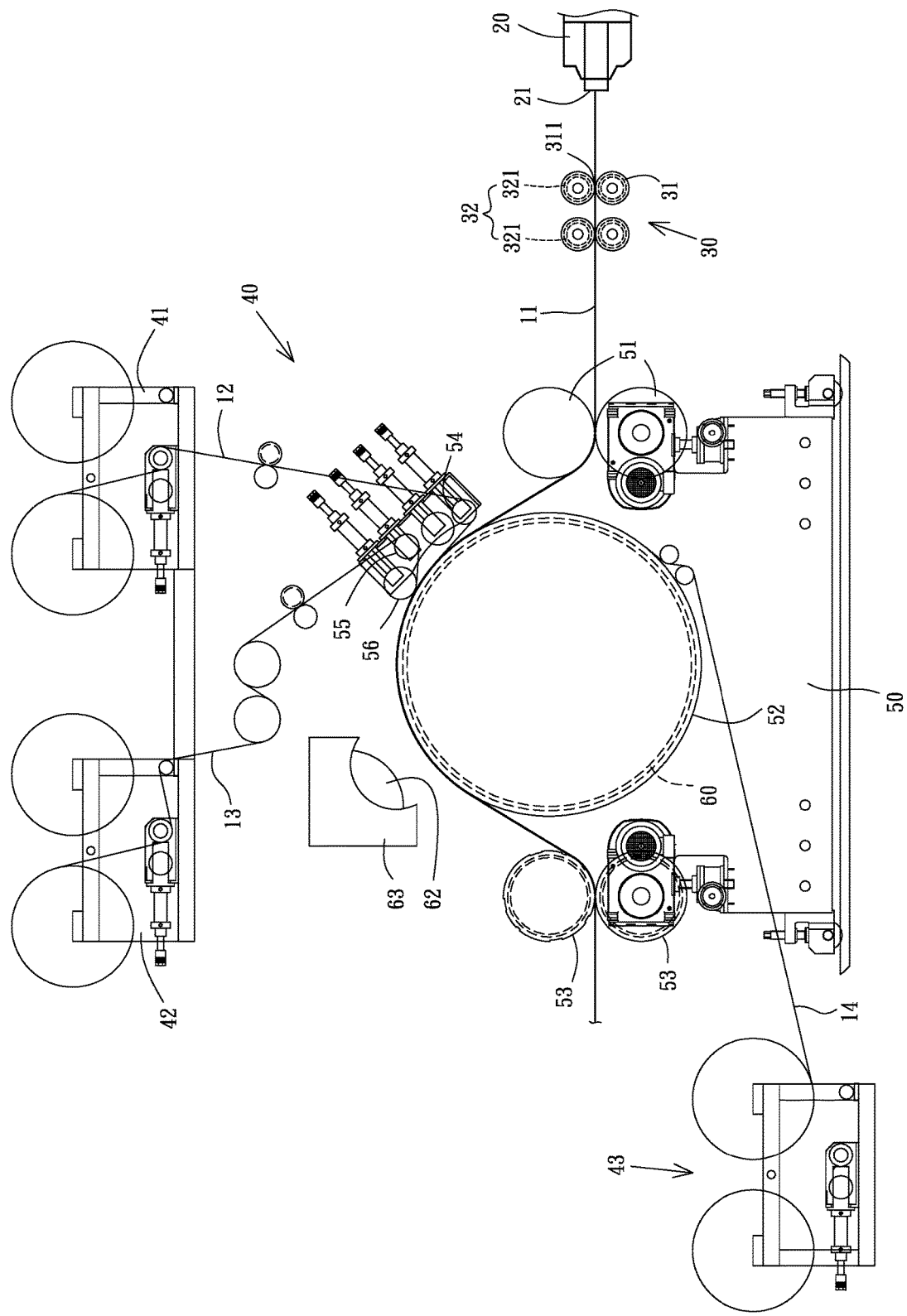
FIG. 2 is a schematic view showing the assembly of the equipment of making the plastic flooring according to the preferred embodiment of the present invention, wherein a press roller has five rollers arranged horizontally.

The heating unit 60 includes multiple guide tubes 61. When the press roller 50 has the four rollers arranged vertically, as shown in FIG. 1, the multiple guide tubes 61 are accommodated in the two delivery rollers 51, the contacting roller 52, and the pressing roller 53 respectively so as to heat the two delivery rollers 51, the contacting roller 52, and the pressing roller 53 by mating with circulating hot oil of an external device (not shown). Referring to FIG. 2, when the press roller 50 has the five rollers (i.e., two delivery rollers 51, a contacting roller 52, and two pressing roller 53) arranged horizontally, the multiple guide tubes 61 are accommodated in the contacting roller 52, and an electric heater 62 is arranged outside and corresponds to the contacting roller 52 housed in a casing 63, hence the electric heater 62 heats the contacting roller 52 after electrifying.

The method of making the substrate of plastic flooring by using the equipment of the present invention comprises steps of:

A. foam molding the foaming sheet 11, wherein after foam molding the plastic material by using the extrusion unit 20, the plastic material is extrusion molded so as to produce the foaming sheet 11;

B. cooling the foaming sheet 11 and regulating the thickness of the foaming sheet 11, wherein when the foaming sheet 11 is delivered through the thickness regulating unit 30, the thickness of the foaming sheet 11 is regulated by the thickness regulating unit 30 and is cooled by the cooler 32;

C. rolling the foaming sheet 11 with the printing layer 12 and the abrasion resistant layer 13, wherein the foaming sheet 11 is conveyed toward the contacting roller 52 of the press roller 50 so as to roll with the printing layer 12 and the abrasion resistant layer 13;

D. rolling the printing layer 12, wherein the printing layer 12 is delivered toward the contacting roller 52 of the press roller 50 by the first roller 41 so as to be rolled;

E. rolling the abrasion resistant layer 13, wherein the abrasion resistant layer 13 is conveyed toward the contacting roller 52 of the press roller 50 by the second roller 42 so as to be rolled;

F. heating the foaming sheet 11, the printing layer 12, and the abrasion resistant layer 13 by using the heating unit 60 so that the foaming sheet 11, the printing layer 12, and the abrasion resistant layer 13 soften;

G connecting the foam layer 11, the printing layer 12, and the abrasion layer 13 by way of the pressing roller 53 of the press roller 50 so as to finish the plastic flooring.

Figure 3:
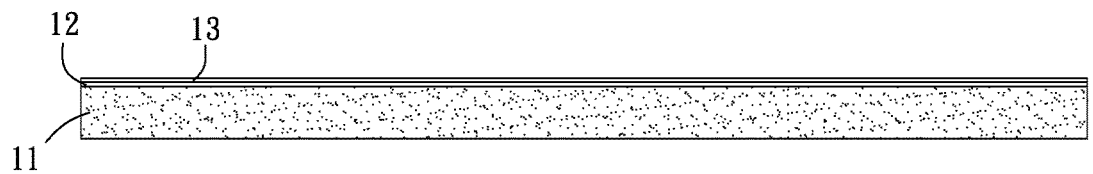
FIG. 3 is a schematic view of a sole-layer foaming sheet according to the preferred embodiment of the present invention.
Figure 4:
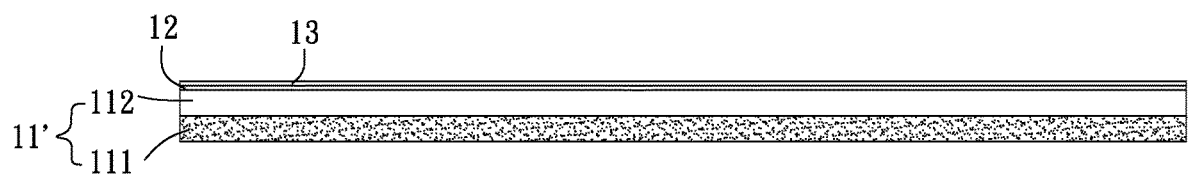
FIG. 4 is a schematic view of a two-layer foaming sheet according to the preferred embodiment of the present invention.

As shown in FIG. 3, a sole-layer foaming sheet 11, the printing layer 12, and the abrasion resistant layer 13 connect together. As illustrated in FIG. 4, a two-layer foaming sheet 11, the printing layer 12, and the abrasion resistant layer 13 connect together, wherein the two-layer foaming sheet 11 has a first layer 111 located on a lower end thereof and made of polyvinyl chloride (PVC), plasticizer, and calcium carbonate so as to be flexible, and the two-layer foaming sheet 11 has a second layer 112 located on an upper end thereof made of foaming agent so as harden the two-layer foaming sheet 11.

Figure 5:
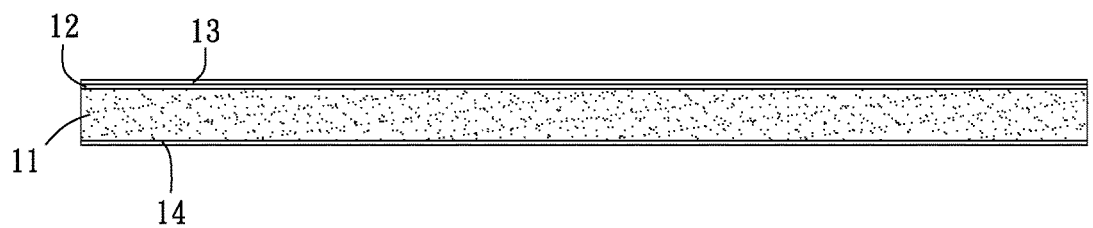
FIG. 5 is a schematic view showing the sole-layer foaming sheet connecting with a base layer according to the preferred embodiment of the present invention.

Referring to FIG. 5, in the step C, when the foaming sheet 11 is conveyed toward the contacting roller 52 of the press roller 50, a base layer 14 is connected on a bottom of the foaming sheet 11 after being delivered to the contacting roller 52 by using a third roller 43 and being rolled with the foaming sheet 11, thus enhancing using comfort of the plastic flooring.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Equipment of making a substrate of plastic flooring comprising:

an extrusion unit being beside the equipment and including an outlet defined on one end of the extrusion unit so that after foam molding plastic material, the plastic material is extrusion molded out of the outlet to produce a foaming sheet;

a thickness regulating unit located outside and corresponding to the outlet of the extrusion unit, the thickness regulating unit including an inlet, a channel configured to deliver the foaming sheet, and a cooler configured to cool the foaming sheet and to regulate a thickness of the foaming sheet;

a rolling apparatus including a first roller, a second roller, and a press roller, wherein the first roller is configured to deliver a printing layer toward the press roller, and the second roller is configured to deliver an abrasion resistant layer toward the press roller;

wherein the press roller is arranged beside the thickness regulating unit, and the press roller includes two delivery rollers, a contacting roller, two pressing rollers, and multiple guiding rollers outside the contacting roller, wherein the contacting roller is configured to roll the foaming sheet, the printing layer, and the abrasion resistant layer together, and a heating unit heats the foaming sheet, the printing layer, and the abrasion resistant layer so that the foaming sheet, the printing layer, and the abrasion resistant layer are connected together by using the two pressing rollers;

wherein the two delivery rollers and the two pressing rollers are located on two sides of the contacting roller respectively, the multiple guiding rollers and the heating unit are located above the contacting roller, and the two delivery rollers are aligned with the thickness regulating unit;

wherein the two pressing rollers contact with each other and are spaced a distance away from the contacting roller of the press roller;

wherein the thickness regulating unit includes multiple roller sets driven by a motor to rotate, wherein the cooler has a cooling tube arranged in each rolling element of each roller set so as to flow cooling water;

wherein when the foaming sheet is delivered through the thickness regulating unit, the thickness of the foaming sheet is regulated by the thickness regulating unit and is cooled by the cooler, and wherein after the foaming sheet is rolled by the two delivery rollers so as to regulate the thickness of the foaming sheet again.

2. The equipment as claimed in claim 1, wherein the extrusion unit is an extruder configured to extrude a sole-layer foaming sheet or is at least two extruders configured to extrude a multi-layer foam with different harnesses in each layer.

3. The equipment as claimed in claim 1, wherein the plastic material of the foaming sheet is physical foamed or is chemical foamed, and an expansion ratio of the plastic material is adjustable based on a thickness of the abrasion resistant layer.

4. The equipment as claimed in claim 1, wherein the heating unit includes multiple guide tubes accommodated in the contacting roller and the two pressing rollers respectively so as to heat the contacting roller and the two pressing rollers by mating with circulating hot oil of an external device.

5. The equipment as claimed in claim 1, wherein the heating unit is an electric heater which is arranged outside and corresponds to the contacting roller and is housed in a casing.

* * * * *